United States Patent [19]
Gardiner

[11] Patent Number: 5,167,483
[45] Date of Patent: Dec. 1, 1992

[54] METHOD FOR UTILIZING ANGULAR MOMENTUM IN ENERGY CONVERSION DEVICES AND AN APPARATUS THEREFORE

[76] Inventor: Samuel W. Gardiner, 170 La Cuesta, San Rafael, Calif. 94904

[21] Appl. No.: 633,021

[22] Filed: Dec. 24, 1990

[51] Int. Cl.⁵ .............................................. F03B 13/12
[52] U.S. Cl. ...................................... 415/3.1; 415/4.5; 415/182.1; 415/906; 415/908; 415/75; 415/91; 416/177; 60/325; 60/721; 290/43; 290/52
[58] Field of Search ............... 415/2.1, 3.1, 4.5, 182.1, 415/183, 905, 906, 908, 71, 72, 75, 91; 416/176, 177; 60/325, 721; 290/52, 53, 43

[56] References Cited

U.S. PATENT DOCUMENTS

| | | |
|---|---|---|
| 2,546 | 4/1842 | Lamb . |
| 1,071,042 | 8/1913 | Fuller .................... 415/72 |
| 1,474,571 | 11/1923 | Wielgolaski .......... 415/2.1 |
| 2,306,742 | 6/1940 | Moody ................... 415/183 |
| 2,387,348 | 11/1945 | Place . |
| 2,544,154 | 3/1951 | Hampton . |
| 3,071,313 | 1/1963 | Weisel . |
| 3,137,477 | 6/1964 | Kofink . |
| 4,176,283 | 11/1979 | McLaren ............... 416/177 |
| 4,272,685 | 6/1981 | Toyama ................. 415/91 |
| 4,465,430 | 8/1984 | De Montmorency . |
| 4,512,716 | 4/1985 | Marr et al. . |

FOREIGN PATENT DOCUMENTS 0112876  9/1980  Japan .................................. 415/182.1

Primary Examiner—Edward K. Look
Assistant Examiner—Christopher M. Verdier
Attorney, Agent, or Firm—Bernhard Kreten

[57] ABSTRACT

An energy conversion device which benefits from forces associated with angular momentum. A mass such as fluid is directed through a conduit from one elevation to a lower elevation with the conduit configured to conform to a decreasing cross-sectional area and oriented in a spiral of substantially conical shape so that fluid entering into the conduit accelerates both by virtue of the decreasing cross-sectional area of the conduit and by the velocity added to the fluid by successively constricting the fluid to an ever tighter spiral path of lesser radius ultimately to an output of the conduit which is in communication with a converter such as a turbine. The converter has an interior passageway in axial alignment with an outlet of the conduit and includes an interior vane which coacts against the fluid exiting from the outlet of the conduit imparting rotation to the rotor which circumscribes the passageway. The rotor is supported on a bearing block and operatively couples to a stator for power output.

22 Claims, 2 Drawing Sheets

METHOD FOR UTILIZING ANGULAR MOMENTUM IN ENERGY CONVERSION DEVICES AND AN APPARATUS THEREFORE

FIELD OF THE INVENTION

The following invention relates generally to methods and apparatus for harnessing energy associated with the angular momentum of a moving mass and benefitting from this angular momentum in extracting power therefrom. One specific manifestation of benefitting from this phenomena involves its utilization in hydroelectric power generation.

BACKGROUND OF THE INVENTION

Objects in orbit are one example of angular momentum wherein the centrifugal force of the body is balanced with respect to centripetal forces in order to achieve a stable orbit. The angular momentum of a particle is defined as the vector product of the instantaneous values of the position vector and the linear momentum, $M = r \times mv$, where M is the Angular momentum of the particle, r is the position vector of the particle, m is the mass of the particle and v is the velocity vector of the particle. For an interacting system of particles, the law of the conservation of angular momentum states that the rate of change of the total angular momentum equals the vector sum of the moments of the external forces applied to the system, $d/dt \Sigma M_s = \Sigma v_s \times F_s$, where the summation is over the particles composing the system. In the absence of external forces, the angular momentum remains constant and no change of configuration can alter the total angular momentum of the system. The principal of conservation applies to angular as well as to linear momentum. Angular momentum being a vector quantity, the principle applies as well to its direction as to its magnitude. The angular momentum of a particle may also be defined as the mass of the particle multiplied by the angular velocity of the particle. While the use of the term "angular velocity" may be extended to any motion of a point with respect to any axis, it is commonly applied to cases of rotation. It is then the vector, whose magnitude is the time rate of change of the angle $\theta$ which the point is rotated through, i.e., $d\theta/dt$, and whose direction is arbitrarily defined as that direction of the rotation axis for which the rotation is clockwise. The usual symbol is $\omega$ or $\Omega$.

The concept of angular velocity is most useful in the case of rigid body motion. If a rigid body rotates about a fixed axis and the position vector of any point P with respect to any point on the axis as origin is r, the velocity v of P relative to this origin is $v = \omega \times r$, where $\omega$ is the instantaneous vector angular velocity.

The average angular velocity may be defined as the ratio of the angular displacement divided by time. Angular acceleration is the time rate of change of the angular velocity, expressed by the vector derivative $d\omega/dt$. The angular velocity of a body in circular orbit can be altered as a function of changes in the radius r which measures the distance between the center of rotation and the path of the body orbiting about the center. Assume initially that the angular momentum of an object constrained to move in a circular path is constant. As the radius decreases, the tangential velocity vector must increase to conserve angular momentum. Surprisingly, this phenomena has never been applied to hydroelectric power extraction to date.

The following patents reflect the state of the art of which applicant is aware insofar as these patents appear relevant to the instant process. The patents are tendered with the object to discharge applicant's acknowledged duty to disclose relevant prior art. However, it is respectfully stipulated that none of these patents when considered singly or when considered in any conceivable combination teach the nexus of the instant invention especially as set forth hereinbelow and as particularly claimed.

| INVENTOR | PATENT NO. | ISSUE DATE |
| --- | --- | --- |
| Lamb, W. | 2,546 | April 11, 1842 |
| Barnes, W. T. | 6,191 | March 20, 1849 |
| Winne, C. H. | 1,263,983 | April 23, 1918 |
| Place, C. I. | 2,387,348 | October 23, 1945 |
| Hampton, E. N. | 2,544,154 | March 6, 1951 |
| Weisel, Z. V. | 3,071,313 | January 1, 1963 |
| Kofink, S. | 3,137,477 | June 16, 1964 |
| Carson et al. | 4,018,543 | April 19, 1977 |
| Sanders, Jr. | 4,076,448 | February 28, 1978 |
| Mysels, K. J. | 4,164,382 | August 14, 1979 |
| DeMontmorency, D. | 4,465,430 | August 14, 1984 |
| Komatsu, H. | 4,473,931 | October 2, 1984 |
| Payne, J. M. | 4,508,973 | April 2, 1985 |
| Marr et al. | 4,512,716 | April 23, 1985 |

The patent to Hampton is of interest since he teaches the use of a turbine having the greatest coincidental structural similarity with applicant's invention. There shown is a turbine for utilization of expanding compressible fluids (such as steam or gases of combustion) for the rotation of a drive shaft. However, Hampton provides only a compressible fluid which is introduced through an inlet 17 at the narrow end of a plurality of tubular members of helical form. The steam is allowed to expand as it passes from helical cross-sections of smaller diameter to greater diameter. This is the diametrically opposed desiderata of the instant invention. Other structural differences devolve from Hampton's uniting the interior drive shaft of the turbine itself with the helical tubes so that the drive shaft of Hampton is centrally disposed within these tubes and is driven thereby.

The remaining citations show the state of the art further and diverge more starkly from the instant invention.

SUMMARY OF THE INVENTION

The instant invention is distinguished over the known prior art in a plurality of ways. When compared with Hampton, for example, inter alia, the instant invention maintains the helical tubes preferably stationary and has the working fluid exiting therefrom to contact a turbine downstream for performing the useful work.

In essence, structure associated with the instant invention includes a conduit having an inlet which receives fluid from a source. The conduit inlet has a center which is radially offset from a center line of a downstream hydroelectric converter such as a turbine. The conduit conically spirals toward an inlet on the hydroelectric converter such that the conduit circumscribes the axis of rotation of the converter. The conduit reduces in cross-section as it extends towards the converter's inlet culminating in a conduit outlet concentric with the axis of the converter for admission of the fluid therewithin. An interior of the hydroelectric converter includes at least one vane having a spiral contour which coacts with the fluid stream impinging thereon.

The characteristics of the fluid contained within the conduit are such that there has been an appreciable increase in the velocity at the point at which the fluid exits the conduit by virtue of the angular momentum that existed initially from having the conduit inlet radially offset from the axis of the turbine converter. Thus, by imparting a vortex-like spinning component to the fluid the efficiency in the turbine converter will have been enhanced.

Another aspect of the conduit geometry involves the gradually decreasing cross-sectional area of the conduit as it advances towards the turbine converter inlet mentioned briefly above. With a conically cross-sectional tapering of the conduit itself, additional acceleration of the fluid will have been permitted.

The specific geometrical aspects of the hydroelectric turbine converter, which are not an essential part of this invention except in combination with the conduit and are illustrative of the use of a turbine interior passageway. The passageway has on inner walls of the passageway at least one vane configured to beneficially interact with the fluid emanating from the conduit. The vane, upon reacting to the fluid exiting from the conduit, will impart motion to a rotor which circumscribes and forms the passageway. The rotor is supported on a bearing block assembly. Rotation of the rotor will affect a circumscribing stator which can be operatively connected to a power output for subsequent utilization.

OBJECTS OF THE INVENTION

Accordingly, it is a primary object of the present invention to provide an apparatus to harness angular momentum of a mass and a method is disclosed to effect same.

A further object of the present invention is to provide a useful and novel method and apparatus for extracting power based on harnessing angular momentum of a fluid.

A further object of the present invention contemplates providing a method and apparatus as characterized above which is relatively simple in construction, has few moving parts and lends itself to mass production techniques.

A further object of the present invention is to provide a method and apparatus as characterized above which is extremely durable in construction and enhances the efficiency of energy extracting systems heretofore known.

A further object of the present invention is to provide a method and apparatus as characterized above which benefits from angular momentum imparted to a fluid body which is caused to follow a path of a somewhat helical contour to achieve the attendant purposes delineated hereinabove.

A further object of the present invention is to provide a method and apparatus as previously described in which the cross-sectional diameter of a conduit within which the fluid is constrained to pass keeps narrowing in cross-sectional area to impart further velocity enhancement.

A further object of the present invention is to provide a device as characterized above which is directed from a conduit outlet to a turbine inlet having a reaction surface integrally formed therewithin so that energy carried within the fluid can be imparted thereto in a most efficient manner.

A further object of the present invention is to provide a method and apparatus as characterized hereinabove which can directly impart power generation as a function of the extracted energy from the fluid stream.

Viewed from one vantage point, it is an object of the present invention to provide a method for imparting angular momentum to a fluid and subsequently extracting from the fluid that energy which has been concentrated by the angular momentum imparted thereto where the steps include directing the fluid such that it translates along an outer periphery of a cone generated by the fluid as it translates along the direction of the cone's long axis in an ever decreasing helix, and having the fluid contact an energy conversion means at an outlet of a conduit which directs the fluid.

Viewed from a second vantage point, it is an object of the present invention to provide a method for extracting kinetic energy from a mass the steps including: directing the mass from a situs of higher potential energy to a site of lower potential energy, rotating the mass while causing the mass to travel along a spiral of decreasing radius, utilizing angular momentum to speed the mass, and impinging the mass against an energy transfer device.

Viewed from a third vantage point, it is an object of the present invention to provide an apparatus for hydroelectric power generation, comprising in combination: a fluid at an upper elevation, a fluid activated impeller at a lower elevation, and at least one conduit extending between said upper elevation to said impeller, said conduit formed in a conically tapering helical configuration.

These and other objects will be made manifest when considering the following detailed specification when taken in conjunction with the appended drawing figure.

BRIEF DESCRIPTION OF THE DRAWING FIGURE

DESCRIPTION OF PREFERRED EMBODIMENTS

Figure 1:
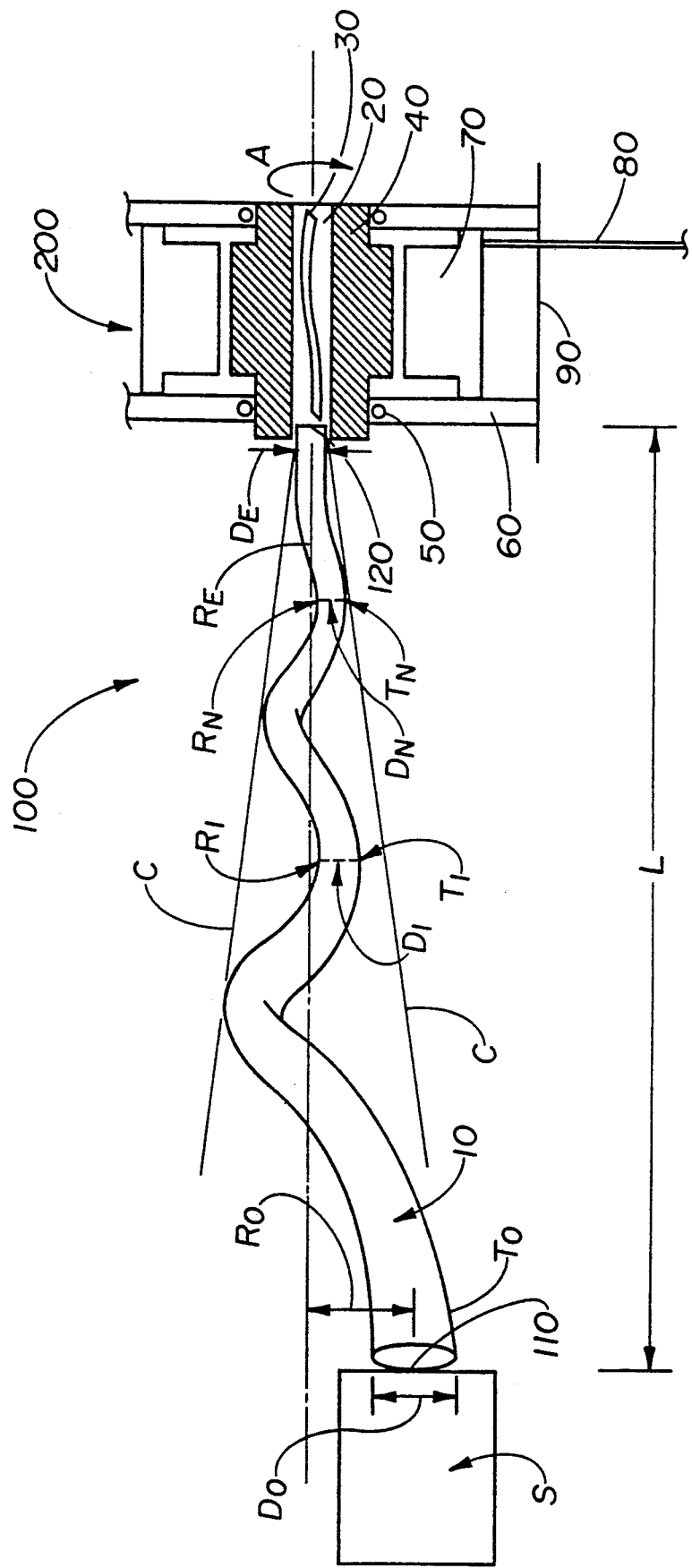
FIG. 1 is a schematic depiction of the apparatus according to the present invention.
Figure 2:
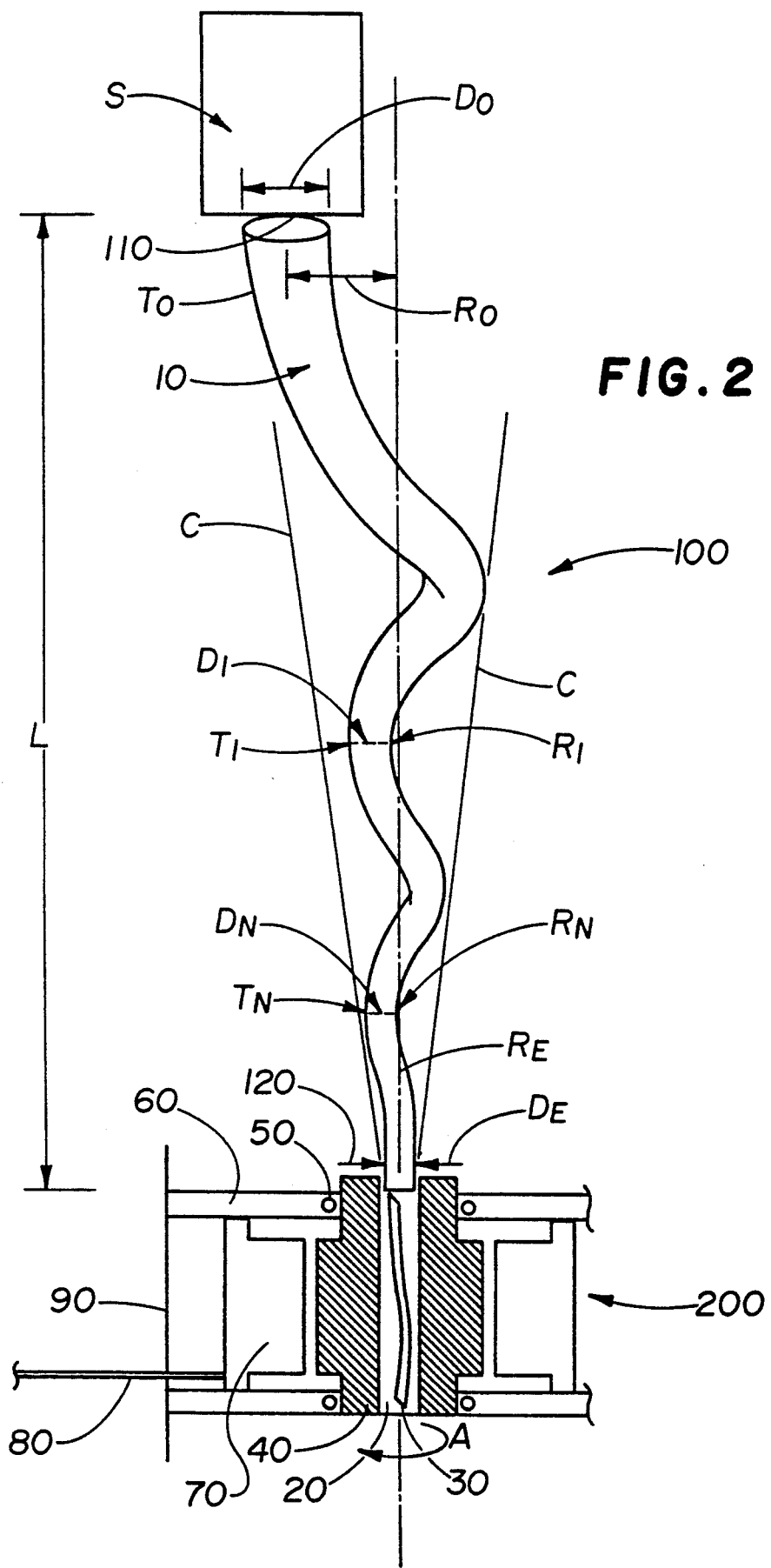
FIG. 2 is the schematic depiction of that which is shown in FIG. 1, rotated 90°.

Considering the drawing now, wherein like numerals refer to like parts throughout, reference numeral 100 is directed to the energy conversion device according to the present invention.

In essence, and with respect to the one drawing figure, the device 100 includes a converter 200 configured substantially as a turbine which receives fluid from a conduit 10. The conduit 10 includes an inlet 110 and an outlet 120. The outlet 120 communicates with a passageway 20 within the turbine 200. The passageway 20 includes at least one vane-type impeller 30 having a spiral configuration synchronized to beneficially extract energy from the fluid exiting the outlet 120 of the conduit 10. The passageway 20 is formed within a rotor 40 which is supported on a bearing block having a support stand associated therewith. A stator 70 circumscribes the rotor 40. Rotation of the rotor 40, for example about arrow "A", induces an electrical field generated between the rotor 40 and the stator 70 to provide power output.

More specifically, drawing FIG. 1, while showing the device 100 oriented such that fluid flow is suggested as moving from left to right, in actuality may perhaps be oriented such that a long axis of the device 100 runs vertically so that the fluid would flow from a higher area, having greater potential energy to a lower area having lesser potential energy as is commonly seen in the environment of hydroelectric dams. A source of fluid S is located adjacent an inlet 110 of the conduit 10. The fluid contained within the source is preferably water, but can be any other type of matter which is amenable to the ensuing manipulative steps.

As shown, the conduit 10 is of substantially circular section when a plane is passed through the conduit 10 at any point substantially perpendicular to the axis shown in the drawing. The conduit is substantially in the form of a helix that conically tapers from the source S to an outlet 120 which is oriented coaxial with the center line axis. In general, there are N turns of the conduit prior to its achieving axial alignment with the inlet passageway 20 of the turbine 200. Thus there are N points of tangency T on one side of the conduit 10 defined by a straight line extending from an outer surface of the inlet 110 to a complemental outer surface of outlet 120 of the conduit 10. At each point of tangency T with the line C generated as a cone, it should be apparent that the radius R as measured from the center of the conduit 10 at the central axis of the turbine 200 decreases as the conduit 10 moves towards the turbine 200. As shown, the various radii as the conduit 10 spirals down to the outlet 120 of the conduit 10 are represented by $R_0, R_1 \ldots R_n$.

At the same time, the conduit 10 is reducing its cross-sectional area as it moves toward the outlet 120. These changes in cross-sectional area are reflected by the various diameters at these points, i.e. $D_0, D_1 \ldots D_n$.

As should now be evident, at least three phenomena come into play when analyzing the fluid flow characteristics within the conduit 10. First, by virtue of the change in the ability to harness potential energy from the inlet 110 to the outlet 120 of the conduit 10, work can be extracted therefrom in the form of kinetic energy by having the fluid move along the conduit's lenght L. Second, by having the cross-sectional area of the conduit 10 decrease ($D_0, D_1 \ldots D_n$) the conduit 10 acts as a converging nozzle which, through angular momentum, imparts to the fluid increased velocity as it moves through the conduit 10. Third, by causing the fluid to move in an ever-decreasing spiral, what would otherwise have been pure linear motion has now had imparted thereto a further force generated from the angular momentum of having the fluid circumscribe the axis in a spiral fashion. Stated alternatively, the fluid at the inlet 110 is separated from the axis by $R_0$ and goes through one twist in the converging spiral until point $R_1$. Multiple twists involving further decreases in radius ($R_2 \ldots R_n$) enhance the effect.

The angular momentum, being constant, imparts greater velocity to the fluid by its rotation about the axis which manifests this greater flow rate (velocity) through the conduit 10, for example, at $R_1$. The effective radius R of the orbiting fluid has decreased ($R_0-R_1$) imparting a higher degree of velocity as the fluid moves downstream. Through successive turns of the conduit 10, this velocity component further increases (to conserve the angular momentum) until the outlet 120 where it is exited from the conduit 10 into the passageway 20 of the turbine 200.

With respect to the hydroelectric converter 200, the following terminology should not be contrued to be limitative. Rather, although a form of turbine is illustrated, it is contemplated that the structure depicted at 200 reflected the physical realities of the mass which passes through the outlet 120 of the conduit 10. Thus, the mass maybe in the form of solid material, liquid or gas.

The converter 200 receives the output from outlet 120 by means of an elongate passageway 20 of substantially cylindrical configuration and oriented parallel to the long axis shown in the drawing figure. An interior of the passageway 20 has at least one integrally formed vane 30 disposed thereon. In essence, the vanes 30 are defined by an inwardly projecting partition emanating from an interior wall of the cylinder and running along the length of the passageway 20. The vane 30, as shown in FIG. 1, also includes a spiral of substantially helical configuration complemental to the conduit's helical pitch.

The vane 30 and passageway 20 are supported within a rotor 40 which is adapted to mve along the direction of the arrow A shown in the drawing figure in reaction to the output from the conduit's outlet 120. Rotation of th rotor 40 is facilitated by its support upon sets of bearings 50 located at an end of the rotor 40 adjacent the conduit's outlet 120 and at an end of the rotor 40 remote therefrom. The bearings 50 in turn are supported upon a support stand 60 of suitable girth to contain the rotor 40 reliable therewithin. The support stand 60 extends up from a support surface base 90. The rotor 40 coacts with a stationary element, stator 70 which circumscribes the rotor 40. Rotation of the rotor 40, as suggested by the arrow A, induces an electrical field in the stator 70 defining an output which is carried away from the converter via power output 80 shown schematically.

In use and operation, the conduit 10 is oriented such that it benefits from a mass such as water held at a higher elevation and allows water to be passed through the conduit 10 to the converter 200 for the purposes set forth herein. It is within the contemplation of the invention that the decreasing spiral of the conduit 10 is "tuned" to the turbine cross-sectional diameter of passageway 20 and vane 30 so that eddies are instilled into the water such that it enhances (synchronizes) with rotor 40 rotation at its designed running speed. That is, "twisted" programmed into the water matches the "twist" rate (rpm) of the turbine. In essence, each separate water molecule is "tuned" to the turbine which may appear as turbulence at the outlet 120.

Moreover, having thus described the invention, it should be apparent that numerous structural modifications and adaptations may be resorted to without departing from the scope and fair meaning of the instant invention as set forth hereinabove and as defined hereinbelow by the claims.

I claim:

1. A method for imparting angular momentum to a fluid and subsequently extracting energy from the fluid whose velocity has been increased by the angular momentum imparted thereto, the steps including:

directing all of the fluid along a path such that it translates along an outer periphery of a cone generated by the fluid as it translates about a long axis of the cone and along an outer periphery of the cone in a helix of ever decreasing radius, and having the fluid contact an energy conversion means at an outlet of the path of the fluid.

2. The method of claim 1 including directing the fluid along the path of the outer periphery of the cone by forming the outer periphery as a conduit of spiral configuration having a decreasing radius between said conduit and the long axis of the cone such that the conduit tapers inwardly along the path of travel.

3. The method of claim 2 including forming the conduit such that the conduit decreases in width and hence also decreases in cross-sectional area along its length towards the fluid outlet, such that the conduit includes a funnel-like geometry as the conduit spirals helically toward the energy conversion means.

4. The method of claim 3 including forming the energy conversion means with an interior passageway coaxially aligned with the outlet of the helically spiraling path of the fluid and placing a reaction vane within the energy conversion means for contact with the fluid.

5. The method of claim 4 including forming the vane on an interior hollow passageway of a rotor and allowing the rotor to react to the fluid impinging against the vane by rotation.

6. The method of claim 5 including selecting water as the fluid and causing the outlet to form a substantially linear section immediately adjacent the passageway for admission into the passageway in contacting the vane.

7. A method for extracting kinetic energy from a mass, the steps including:
    directing the mass from a situs of higher potential energy to a site of lower potential energy,
    rotating the mass while directing the mass to lower potential energy by causing the mass to travel along a curving pathway, an amount of curve of the pathway being defined by a radius of curvature between a central axis and each point along the pathway, the radius of curvature decreasing as the pathway extends toward the site of lower potential energy, such that the pathway is substantially a spiral of decreasing radius, utilizing angular momentum to impart speed to the mass, and
    impinging the mass against an energy transfer device.

8. The method of claim 7 including causing the mass to travel along a spiral of decreasing radius while displacing the mass in a direction parallel to the central axis about which the spiral of decreasing radius rotates so that a combination of linear and spiral translation effectively generates a conical path truncating along the mass' direction of travel.

9. The method of claim 8 including decreasing a width of the path and hence a cross-sectional area of the path through which the mass travels as it translates along the spiral and linear conical path.

10. The method of claim 9 further including having an end of the conical path, corresponding to an end of lesser radius of a cone traced by the conical path, terminate at an outlet in a substantially axial fashion and having the outlet contact the energy transfer device in a substantially coaxial manner.

11. The method of claim 10 including having the mass contact the energy transfer device by placing a vane within a hollow passageway within the energy transfer device whereupon impingement of the mass against the vane imparts a reaction to the vane.

12. The method of claim 11 including securing the vane on a rotatable structure and allowing the vane and rotatable structure to rotate in response to the impingement.

13. The method of claim 12 including forming the rotatable structure as a rotor supported on a bearing so that the rotor rotates with the vane.

14. The method of claim 13 including allowing the rotor to coact with a stator, including forming the stator to circumscribe the rotor.

15. An apparatus for hydroelectric power generation, comprising in combination:
    a fluid at an upper elevation,
    a fluid activated impeller at a lower elevation,
    and at least one conduit extending from the upper elevation to said impeller,
    said conduit formed in a conically tapering helical configuration, circumscribing an imaginary cone in a manner such that a conical radius defined by a distance between a central longitudinal axis of the cone and a center of said conduit decreases as said conduit extends from the upper elevation to the lower elevation.

16. The apparatus of claim 15 wherein said conduit has a width and hence a cross-sectional area which decreases as it moves from the upper elevation to the lower elevation.

17. The apparatus of claim 16 wherein said impeller is configured as a helically formed vane contained within a passageway which reacts to the fluid impinging there against by rotation.

18. The apparatus of claim 17 wherein the impeller includes a circumscribing housing defining a rotor, said rotor being supported on a bearing block, said bearing block isolating said rotor from a stator, said stator coupled to said rotor in a manner such that power output results.

19. The apparatus of claim 18 wherein said conduit changes its distance from a center line of said passageway within which said impeller is located and said conduit moves closer to the center line upon each rotation of the conduit through the conically tapering helical configuration so that an increase in velocity occurs to the fluid therewithin through the requirement that angular momentum be conserved.

20. The apparatus of claim 19 wherein a reservoir is disosed at said upper elevation within which said fluid is contained and wherein said fluid is water.

21. An apparatus for power generation from a compressible fluid including an impeller actuated by the fluid and which drives a conversion device, comprising in combination:
    a conduit having a proximal, downstream end adjacent to the impeller and a distal end upstream from said proximal end, said conduit formed in a conically tapering helical configuration.

22. The apparatus of claim 21 wherein said conduit decreases in cross-sectional area between said distal end and said proximal end.

* * * * *